(12) United States Patent
Bekedam

(10) Patent No.: US 6,202,676 B1
(45) Date of Patent: *Mar. 20, 2001

(54) MAGNETIC LIQUID CONTROL FOR BOILER FEEDWATER RECEIVERS

(76) Inventor: Martin Bekedam, 19059 North 8th Ave., Westbrook Village, Peoria, AZ (US) 85382

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,000

(22) Filed: Feb. 16, 1999

(51) Int. Cl.[7] .............................. F16K 31/34; F16K 33/00
(52) U.S. Cl. .......................... 137/413; 137/426; 137/429; 251/65
(58) Field of Search ...................... 137/412, 413, 137/414, 429, 430, 434, 426; 251/65

(56) References Cited

U.S. PATENT DOCUMENTS

| | | | |
|---|---|---|---|
| 473,056 | * 4/1892 | Bosworth | 137/413 |
| 1,354,311 | * 9/1920 | Landrum | 137/413 |
| 1,587,172 | * 6/1926 | Muller | 137/414 |
| 1,745,762 | * 2/1930 | Honiss | 251/65 |
| 2,231,158 | * 2/1941 | Davis | 251/65 |
| 2,339,469 | * 1/1944 | Emanuel | 137/414 |
| 2,356,970 | * 8/1944 | Brockett | 137/429 |
| 2,752,932 | * 7/1956 | Newboult | 251/65 |
| 3,094,008 | * 6/1963 | Hardie | 251/65 |
| 3,120,241 | * 2/1964 | Parks | 137/413 |
| 3,167,694 | * 1/1965 | Bekedam . | |
| 3,245,425 | * 4/1966 | Meyer et al. | 251/65 |
| 3,504,316 | * 3/1970 | Bekedam . | |
| 4,836,239 | * 6/1989 | Kinkead | 137/413 |
| 4,865,073 | * 9/1989 | Kocher | 137/429 |
| 5,080,126 | * 1/1992 | De Rycke et al. | 137/413 |

* cited by examiner

*Primary Examiner*—George L. Walton
(74) *Attorney, Agent, or Firm*—Richard Esty Peterson

(57) ABSTRACT

A liquid level control unit having a permanent magnet mechanism for translating displacements of a displaces element in the liquid of a container to an actuator device that actuates a control system for a regulated device such as a supply water control valve in a boiler system the control unit utilizing concentrically positioned annular magnet assemblies that are separated by a tube to shield the environment of one magnet assembly from the other.

15 Claims, 2 Drawing Sheets

MAGNETIC LIQUID CONTROL FOR BOILER FEEDWATER RECEIVERS

BACKGROUND OF THE INVENTION

This invention relates to a liquid level control unit that has particular application in regulating the level of water in a feedwater receiver of a boiler system. The liquid level control unit is adapted to translate changes in the level of a liquid of several inches into small displacements of 3 or 4 thousandths inch. In the preferred embodiment, the translated displacement operates an air valve that controls an air-operated, water control valve for adding make-up water to the feedwater receiver.

The liquid level control unit of this invention is suitable for isolated liquid systems. In a feedwater receiver for a boiler system, the water in the receiver is circulated to a boiler in a circuit that avoids contact with air. In order to translate movement of a internal water displacer device within the receiver tank to an external air valve actuator, the control unit utilizes a magnetic motion transfer mechanism. With this mechanism the internal displacement apparatus is isolated from the external actuator apparatus. The unit does not utilize seals or diaphragms that wear and may eventually leak. Also, the unit is entirely mechanical in operation. In this manner the unit is suitable for use in systems such as a boiler systems where auxiliary components must have a high degree of reliability. It is desirable that the control system be operable during a temporary electrical power failure. Therefore, the unit utilizes a mechanical permanent magnet actuation mechanism to actuate changes in a pressurized air circuit which regulate the water control valve of the boiler system supply water.

SUMMARY OF THE INVENTION

This invention relates to a liquid level control unit that in its preferred embodiment regulates a water supply valve for make-up water in a boiler system. The preferred embodiment of the liquid level control unit includes an actuator mechanism with an air valve to regulate an air-controlled water valve. The air-controlled water valve operates when the water level in a receiver tank for the boiler feedwater drops below a predetermined level. During such state the water valve opens to connect a water supply source to the receiver tank and supplies water until the water level rises and the liquid control unit determines that the appropriate level has been reached, causing the water valve to close.

In a boiler system the feed water receiver tank provides for storage of treated water supplied to the boiler. The receiver tank is partially filled with conditioned and deaerated water that is returned to the tank from the boiler as condensate. During continuous cycling of water to and from the boiler, losses occur that necessitate replenishment as make-up water from a supply source. In order to provide for deaeration of the make-up water and to accommodate for surges in the water supply, the receiver tank is not filled to capacity and the water level is maintained at an optimized level during operation.

The liquid level control unit of this invention includes a displacer element that is suspended in the receiver tank and partially immersed in the water. The displacer element is preferably made of a sinkable material, although a floatable material may be suitable in certain environments.

The preferred displacer element is a cylindrical weight suspended by a rod that is connected to a spring. The rod and spring connection preferably places the spring in compression. The rod has a distal end with a permanent magnet assembly that includes a pair of annular magnets that sandwich a Teflon® guide washer. The guide washer has a slightly greater diameter than the annular magnets and allows displacement of the magnet assembly in a stainless steel tube. The tube has an open end in communication with the receiver tank through which the rod and magnet assembly are installed and a closed end that isolates the displacer components from the external environment.

The cylindrical tube projects from the receiver tank with the closed end contained in a housing. The housing also encases a magnetic actuator mechanism with an external permanent magnet assembly having a pair of annular magnets mounted on a displacement plate and concentrically positioned over the cylindrical guide tube at the location of the pair of magnets within the tube.

The displacement plate functions as a cantilevered balance beam with linear displacements of the immersed displacer element translated into small arcuate displacements of the displacement plate. The displacement plate is supported on a pair of spaced springs against a pivot and acts as an actuator lever against an air release valve.

The air release valve forms part of a pressurized air circuit that includes an air supply, a constricted flow orifice, a pressure gauge, and an air regulated water control valve.

In the preferred embodiment the housing has a base plate with two alternate locations for mounting the air release valve, so that the system can be used with a direct acting or reverse acting valve. The liquid level control unit includes an adjustment mechanism for limited adjustment of the flow rate of the makeup water by altering the applied force of the displacement plate on the air release valve. These and other features will become apparent on a consideration of the detailed description of the preferred embodiment that follows.

DETAILED DESCRIPTION OF THE PREFERRED EMBODIMENTS

Figure 1:
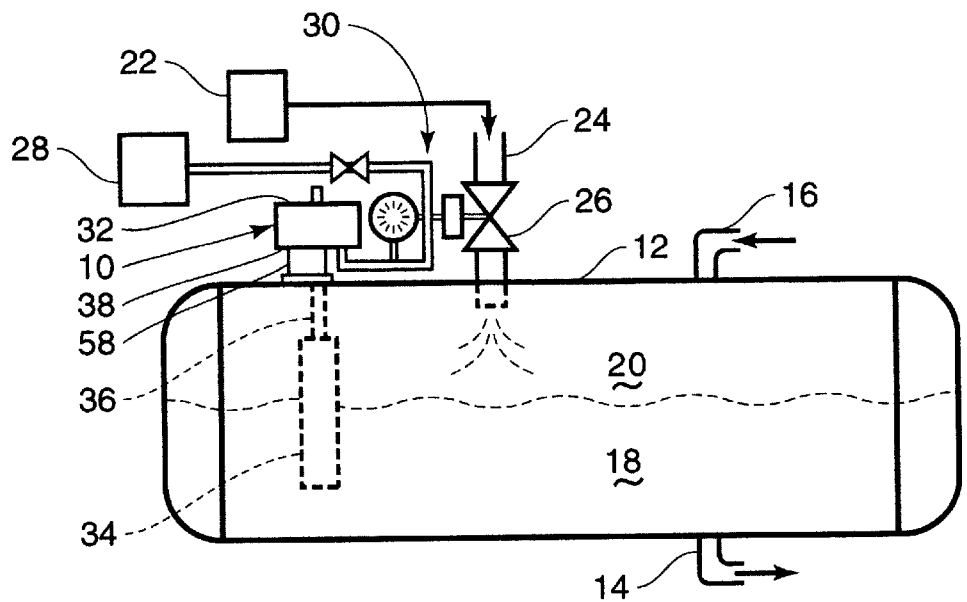
FIG. 1 is a schematic view of the liquid level control unit of this invention incorporated on a feedwater receiver tank for a boiler system.
Figure 3:
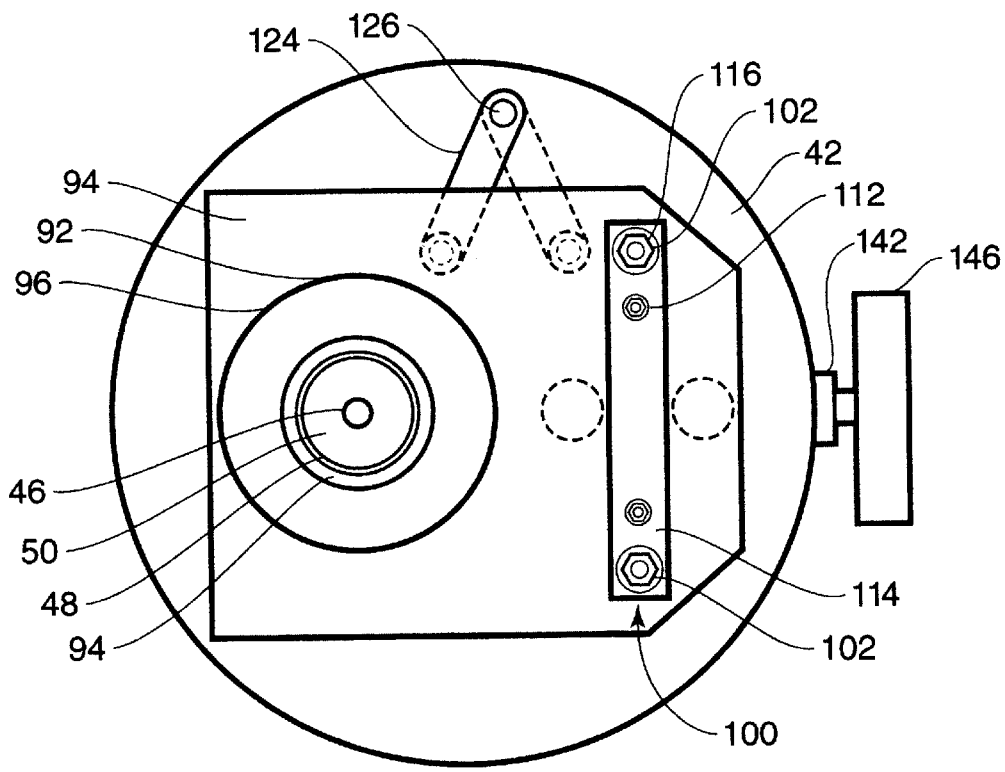
FIG. 3 is a top view of the liquid level control unit of FIG. 2 with a cover removed.

The liquid level control unit of this invention, designated generally by the reference numeral 10, is particularly adapted for regulating the level of a liquid in an environment that is isolated from the control system. In the preferred embodiment described, the liquid level control unit is utilized to regulate the level of water within a feedwater receiver tank of a boiler system.

Referring to FIG. 1, a feedwater receiver tank 12 stores conditioned and deaerated water for a boiler (not shown). Water 18 is drawn from the receiver tank 12 through a boiler supply conduit 14 and returned as a condensate through return conduit 16. Water is maintained at a predefined optimal level, shown in dotted line with a space 20 above the water that is filled with steam or water vapor during the deaeration process and operation of the boiler.

Because of inevitable losses during circulation of water in its forms as a liquid and gas, makeup water is periodically supplied from a water supply, designated schematically by the reference numeral 22 in FIG. 1. Supply water under pressure is delivered through a supply line 24 regulated by a water control valve 26. In the embodiment shown the water control valve 26 is regulated by pressurized air from an air supply 28. Preferably the water supply 22 and air supply 28 for the boiler system comprise pressurized storage tanks, which are functional during temporary losses of electrical power. The liquid level control unit 10 is operable with other electrical or hydraulic liquid supply controls by modification of the regulator device being actuated by the control unit.

In FIG. 1 the control unit 10 includes air regulator apparatus 30 and a magnetic actuator device 32. The magnetic displacer device utilizes a displacer element 34 shown in dotted line in FIG. 1, partly immersed in water 18 in the receiver tank 12. The displacer element 34 is a cylindrical weighted member that is suspended on a rod 36 that extends into a housing 38.

Figure 2:
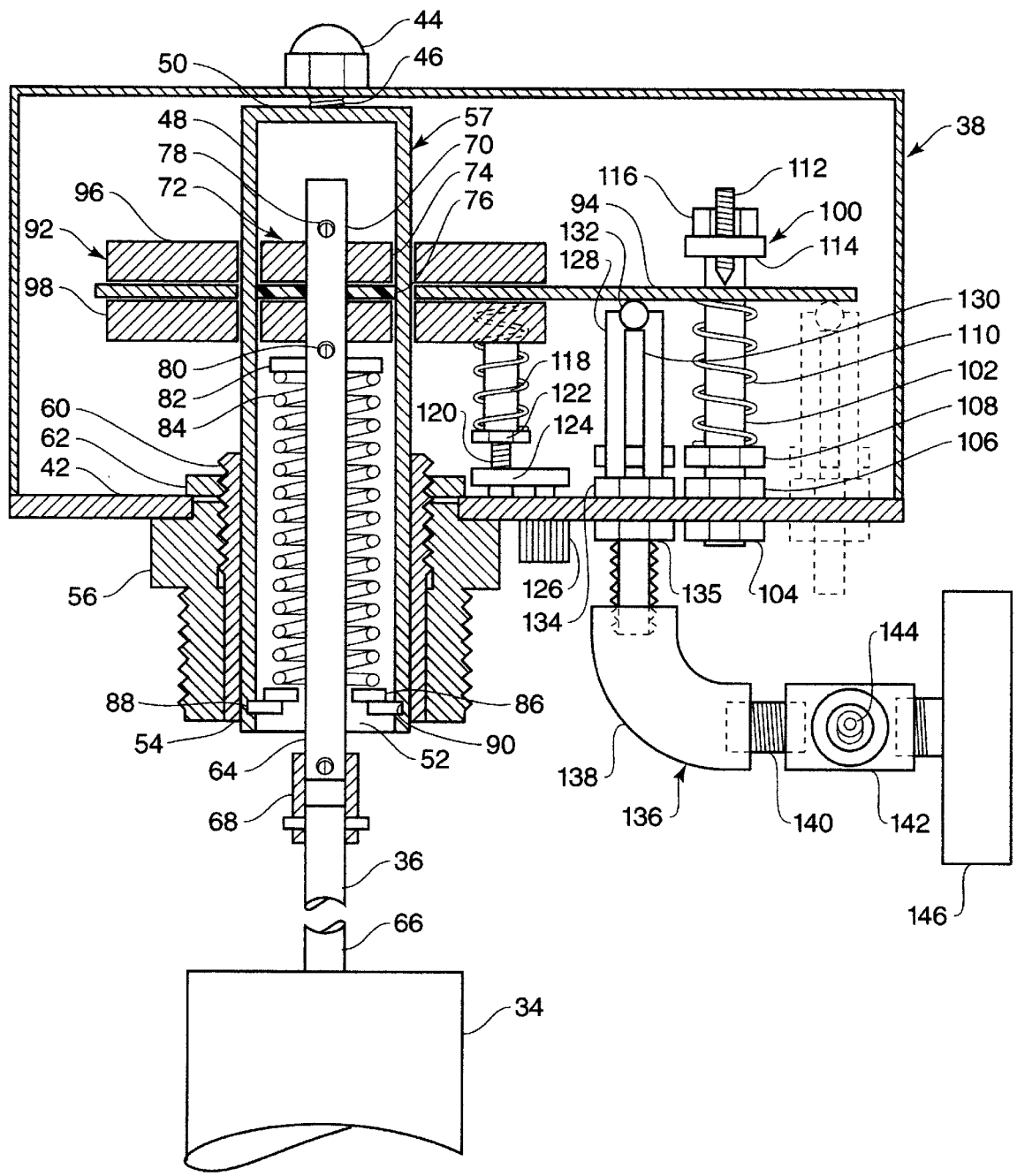
FIG. 2 is a cross sectional view of the liquid level control unit of FIG. 1.

Referring to FIG. 2, the housing 38 includes a cylindrical cover 40 mounted on a circular base platform 42 and retained by a cap nut 44. The cap nut 44 is threaded on a threaded post 46 top of a cylindrical tube 48.

The cylindrical tube 48 has a closed end 50 and an open end 52 that communicates with the environment inside the receiver tank 12 shown in FIG. 1. In this manner the components inside the receiver tank 12 are isolated from the external components by the capped tube 48 which forms a shield. The tube 48 is welded to a threaded sleeve 54 which in turn is fixed to a threaded reducer 56 form that together a tube assembly 57. The threaded sleeve 54 projects through an opening 60 in the base plate 42 and is engaged by a retainer nut 62, which secures the tube assembly 57 to the housing.

The reducer 56 connects to a short standpipe 58 threaded into a port on the receiver tank 12 to position the magnetic actuator device 32 over the tank 12 as shown in FIG. 1. The rod 36 of the displacer element 34 has an extension segment 64 connected to a segment 66 fixed to the displacer element by a gimbal coupler 68 to insure the displacer element is vertically suspended in the tank. The extension segment 64 has an end 70 located within the closed tube 48 with a first magnet assembly 72 comprising a pair of annular permanent magnets 74 with a Teflon® washer 76 therebetween. The Teflon® washer has a slightly larger diameter than the annular permanent magnets to provide a slidable positioning guide that maintains the magnets 74 displaced from the tube 48. The magnet assembly is held by cotter pins 78 and 80. The lower pin 80 also positions a spring retainer 82 for a compression spring 84. The compression spring 84 is seated on a second spring retainer 86 held in place by a clip 88 that engages a groove 90 within the tube.

The compression spring 84 and rod length are preselected to position the first magnet assembly 72 at a predefined calibration position when the displacement element 34 is immersed at the predefined optimal water level at approximately one-half its length.

With reference to this optimum position, a second magnet assembly 92 is concentrically positioned relative to the calibration position of the first magnet assembly 72. The second permanent magnet assembly 92 is mounted on a balance beam in the form of an actuator plate 94 with a first annular magnet 96 mounted on one side of the plate 94 and a second annular magnet 98 on the opposite side of the plate 94. The plate 94 is supported above the platform 42 with the magnet assembly 98 located around the closed-end tube 48 by a pivot assembly 100. The pivot assembly 100 includes a pair of spaced support bolts 102 extending through the plate 94. Each bolt 102 is fastened to the base platform 42 by a bottom nut 104 and a clamping nut 106. An adjustment nut 108 supports a compression spring 110 on each bolt 102 against the underside of the actuator plate 94. The actuator plate 94 is biased against a pair of spaced pivot points 112 threaded into a cross member 114 connected to the two bolts 102. The cross member 114 is pressed against the bolt heads 116 by the action of the compression springs 110 against the underside of the actuator plate 94 as applied to the pivot points 112.

The cantilevered actuator plate 94 floats on an adjustment spring 118 projecting from a location bolt 120. The spring 118 seats on an adjustment nut 122 on the bolt, which is threaded to a swing arm 124 of a pivot knob 126. By twisting the pivot knob 126 the adjustment spring can be repositioned toward or away from the pivot points 112 forming the pivot axis of the actuator plate 94. This change in the effective moment arm, changes slightly the degree of angular displacement of the actuator plate for a given drop in liquid level.

The actuator plate 94 acts on an air relief or bleed valve 128 shown in cross section in FIG. 2. The air valve 128 has a passage 130 with a contact ball 132 that is actuated by angular displacements of the actuator plate 94. The air valve 128 is attached to the base platform 42 by nuts 134 and 135. The air valve 128 may be located in either of two positions depending whether the valve an indirect bleed valve as shown in cross section, or a direct valve as shown in the alternate position in dotted line. The indirect bleed valve 128 releases pressurized air when the ball 132 is depressed when the actuator plate 94 is downwardly pivoted upon lowering of the liquid level.

The pressurized air is supplied, through the air circuit 136 which includes an elbow 138 connected to the air valve 128 and with a nipple 140 connecting the elbow to a cross 142. The cross 142 interconnects the control unit 10 to a pressurized supply with a flow restriction 144, a pressure gauge 146 and a line to the liquid control valve 26 shown in FIG. 1.

The air pressure is supplied at 20 p.s.i. and because of the flow restriction, is quickly reduced in the down flow side of the restrictor 144 by release through the air valve 128 of the control unit 10. In operation, when the water level is lowered, typically by periodic losses during cycling, the effective weight of the displacer element 34 is greater causing the displacement element 34 to compress the support spring 84 and perceptively lower. The lowering of the displacer element and the attached first magnet assembly 72 through magnetic attraction causes the second magnet assembly 92 to follow. Displacement of the second magnet assembly and the attached actuator plate 94 acts like a lever arm and actuates the ball 32 of the air valve, depressing the ball and releasing air from the air circuit. The lowered air pressure in the down flow side of the flow restrictor regulates the air regulated water control valve, (typically a diaphragm and spring control) partially opening the valve and allowing water to flow into the tank until the water level raises the displacement element and the actuator plate to release the ball to an air blocking position. The pressure in the down flow side of the restriction rises and closes the water control valve.

Adjustment in the response time of the modulated liquid level control unit is accomplished by the positioning of the adjustment spring. Initial calibration is accomplished using the adjustment nut 122 for the adjustment spring, and operational adjustments are made using the pivot knob which has a hex recess (not visible) for convenient use of an Allen wrench.

The use of the two permanent magnet assembles allows motion in the environment of the receiver tank to be translated to the environment external to the receiver tank. Although the function in the preferred embodiment is to prevent the conditioned and deaerated water from the receiver tank from being contaminated by air, the function could equally well be the protection of the external environment from toxic liquid and gas within the receiver tank.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A liquid level control unit for maintaining liquid in a container at a predefined level comprising:
   a magnetic actuator device having:
   a) a displacement member locatable in a container having a liquid wherein the displacement member is at least partly immersible in the liquid;
   b) a support structure mountable over the container, the support structure having a support mechanism connected to the displacement member wherein the displacement member is supportable in the liquid in the container by the support mechanism with the displacement member displaceable relative to the support structure when the liquid level in the container changes, and wherein the support mechanism includes a spring assembly wherein at least a portion of the displacement member engages the spring assembly;
   c) a first magnetic assembly connected to the displacement member and moveable with the displacement member;
   d) an actuator mechanism mounted on the support structure the actuator mechanism having an arm member and a pivot assembly;
   e) a second magnet assembly mounted on the arm member proximate to the first magnet;
   f) a shield structure mounted to the support structure between the first magnet assembly and the second magnet assembly and isolating the first magnet assembly from the second assembly, wherein displacement of the first magnet assembly is magnetically translated in a corresponding displacement of the second magnet assembly and the arm member; and,
   g) a valve assembly operably connectable to a liquid supply control mechanism, the valve assembly having a displaceable actuated member contacting the arm member of the actuator mechanism wherein liquid is supplied to the container on select actuation of the actuated member in response to changes in the liquid level in the container.

2. The liquid level control unit of claim 1 wherein the displacement member includes a sinkable displacer element.

3. The liquid level control unit of claim 2 wherein the displacement member element has a rod connected to the displacer element with means for suspending the rod and displacer element from the spring assembly.

4. The liquid level control unit of claim 3 wherein the first magnet assembly is mounted to the rod.

5. The liquid level control unit of claim 4 wherein at least a part of the rod, the spring assembly and the magnet assembly are contained in a tube having a closed end.

6. The liquid level control unit of claim 4 wherein the second magnet assembly includes at least one annular magnet concentric to the first magnet assembly.

7. The liquid level control unit of claim 6 wherein the shield structure has means for shielding the environment of the second magnet assembly from the first environment of the magnet assembly.

8. The liquid level control unit of claim 6 wherein the shielding means comprises a tube having a closed end wherein the tube engages the first magnet assembly and the support mechanism of the displacer element.

9. The liquid level control unit of claim 6 wherein the value assembly comprises a pressurized air circuit with an air valve having an actuatable member in contact with the arm member of the actuator mechanism.

10. The liquid level control unit of claim 9 wherein the actuatable member comprises a displaceable ball in the air valve.

11. A liquid level control unit for maintaining liquid in a container at a predefined level comprising;
    a magnetic actuator device having,
    a) first permanent magnet means for generating a magnetic field wherein the magnet means has a magnet assembly;
    b) a displacement means connected to the first magnet means, the displacement means being locatable in the container and at least partially immersed in the liquid in the container for producing a displacement in the first magnet means corresponding to a change in the level of liquid in the container;
    c) second permanent magnet means for generating a magnetic fields, the second magnet means having an annular magnet assembly being positioned proximate and concentric to the magnet assembly of the first magnet means with mutual magnetic attraction of the magnet assemblies wherein displacements of the first magnet means induce displacements of the second magnet means;
    d) valve means for regulating a controlled device, the valve means having an actuatable member for controlling the liquid level in the container;
    e) pivotal actuator means for actuating the actuatable member of the valve means, wherein the second magnet means is mounted along a portion of said pivotal actuator means and pivots the actuator means on displacements of the second magnet means; and,
    f) shield means separating the displacement means and the first magnet means from the actuator means and the second magnet means, wherein the second magnet means is mounted around a portion of said shield means.

12. The liquid level control unit of claim 11 wherein the magnet assembly of the first permanent magnet means is annular.

13. The liquid level control unit of claim 11 wherein the magnet assembly of the first permanent magnet means includes first and second annular magnets with a separator member therebetween, and the magnet assembly of the second permanent magnet means includes first and second annular magnets with a separator member therebetween.

14. The liquid level control unit of claim 13 wherein the displacement means includes a rod member, wherein the annular magnets of the first permanent magnet means are mounted together on the rod and separated by an annular slidable washer, and wherein the shield means comprises a tube, the annular magnets of the first permanent magnet means having a diameter and the slidable washer having a diameter slightly larger than the diameter of the annular magnets of the first permanent magnet means, the slidable washer being slidable in the tube.

15. The liquid level control unit of claim 14 wherein the pivotal actuator means includes a plate and wherein the separator member between the annular magnets of the second permanent magnet means comprises the plate.

* * * * *